INVENTOR.
Walter V Chery

Sept. 21, 1965     W. V. CHERY     3,207,004

TRANSMISSION

Filed Aug. 6, 1962     2 Sheets-Sheet 2

INVENTOR.
Walter V Chery

United States Patent Office 3,207,004
Patented Sept. 21, 1965

3,207,004
TRANSMISSION
Walter V. Chery, 908 Fairview Ave., Meadville, Pa.
Filed Aug. 6, 1962, Ser. No. 215,216
13 Claims. (Cl. 74—798)

This invention relates to transmissions and, more particularly, to planetary transmissions of the friction type with widely varying speed ratios.

This application is a continuation-in-part of patent application, Serial No. 837,856, filed Sept. 3, 1959, and patent application, Serial No. 24,925, filed Apr. 27, 1960, which issued as Patent No. 3,048,058 on Aug. 7, 1962.

The parent applications disclose various embodiments of friction transmissions. The present invention discloses an improvement over said inventions in that the embodiments disclosed herein have advantages in certain applications where high ratios are involved.

It is, accordingly, an object of the present invention to provide a transmission wherein planetary rolls exert balanced forces on the sun rollers and ring rollers with an improved preloading arrangement.

A further object of the invention is to provide a planetary transmission which is simple in construction, economical to manufacture, and simple and efficient in operation.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

Figure 1:
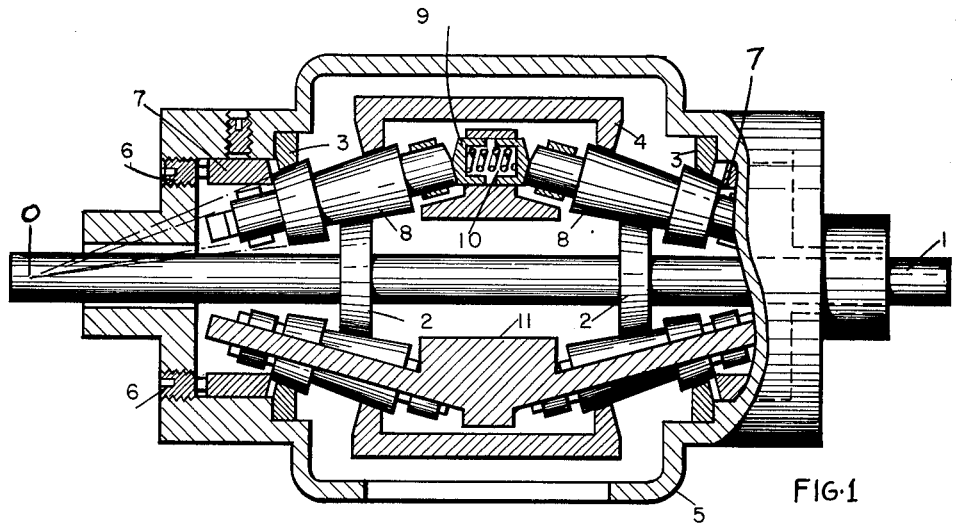
FIG. 1 is an outline view partly in cross section of a transmission according to the invention wherein the planetary cage serves as a separator for the planetary rollers.

Now with more particular reference to the drawings, FIG. 1 shows a friction power transmission wherein either a shaft 1 or an outer ring 4 or housing 5 can be used as either an output or input or can be held stationary by braking means, depending upon the application. The transmission consists of two rows of frusto-conical planetary tapered rolls 8 which are preloaded; that is, urged into engagement with the inner surface of the ring 4 by springs 10. The springs 10 urge the rolls 8 in opposite directions from each other. Therefore, the system is balanced. The ends of bushings 9 are in rolling contact with the ends of the planetary rolls 8.

The small diameter portions of the planetary rolls 8 are in linear rolling contact with frusto-conical sun rolls 2. The sun rolls 2 are integral with, and are a part of, the shaft 1. The planetary rolls 8 have an enlarged frusto-conical portion of large diameter. This large diameter portion is in linear rolling contact with the inside races or surfaces of ring 3. The ring 3 is integral with and a part of the housing 5. The planetary rolls 8, sun rolls 2, and outer rings 3 are in the form of a frusto-conical surface developed from the center 0. That is, the developed apex of the frusto-conical parts have their apex at 0.

A cage 11 has the central part which carries the inner ends of the planetary rolls in suitable bearings. Springs 10 are supported in opposed cup-shaped bushings 9 slidably received in bores therein. The outer part of the cage 11 has bores with suitable bearings to carry the outer ends of the planetary rolls 8.

Locating rings 7 are adjustable by means of screws 6 and are used to prevent over-travelling of the planetary rolls 8 when the sun rolls 2 and outer rings 3 and 4 are not concentric due to manufacturing errors in case of large size transmissions when the concentricity of parts is difficult to hold. The adjustment of the rings 7 is made by the screws 6 so that the over-travelling is eliminated. The rings 7 contact the planetary rolls at the point where the speed of the planetary rolls is zero, the rings 3 being stationary. Therefore, the wear at the contact is practically nil.

The rings 3 are free in the housing 5 but are held stationary by friction developed by the rolls 8 which transmit the load from the springs 10. The springs 10 are selected of such value that the rings 3 are held stationary by friction under a normal transmitted load but will slip in case of overload and, therefore, provide overload protection. The planetary cage in this arrangement merely serves as a separator for the planetary rolls.

Figure 2:
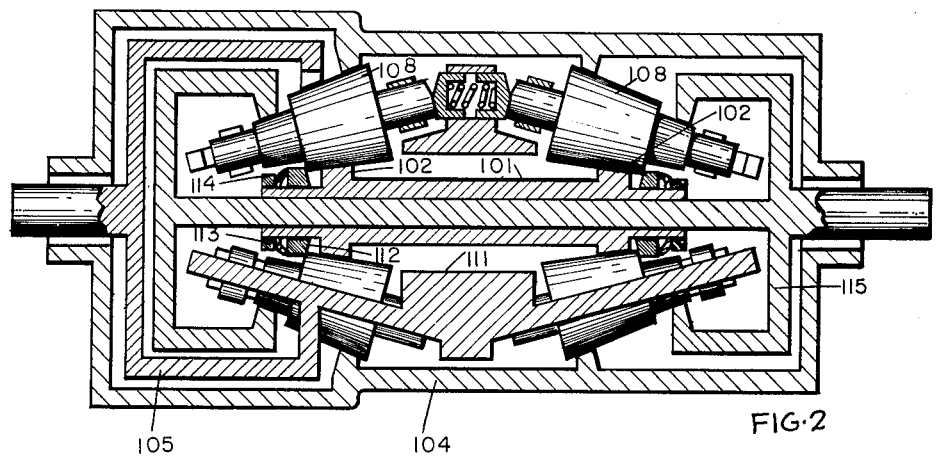
FIG. 2 is a view of another embodiment of the invention wherein the planetary cage serves as an input and a load may be connected thereto.

FIG. 2 shows a friction transmission wherein a planetary cage 111 or outer rings 115 can either be input or output and sun rolls 102 and a shaft 101 are free rotating members.

Over-travelling of planetary rolls 108 in an axial direction is prevented by spring loaded collars 112. The collars 112 can slide on the shaft 101 and are preloaded by belleville springs 113 or other suitable springs. Collars 114 are locked on the shaft 101.

Figure 3:
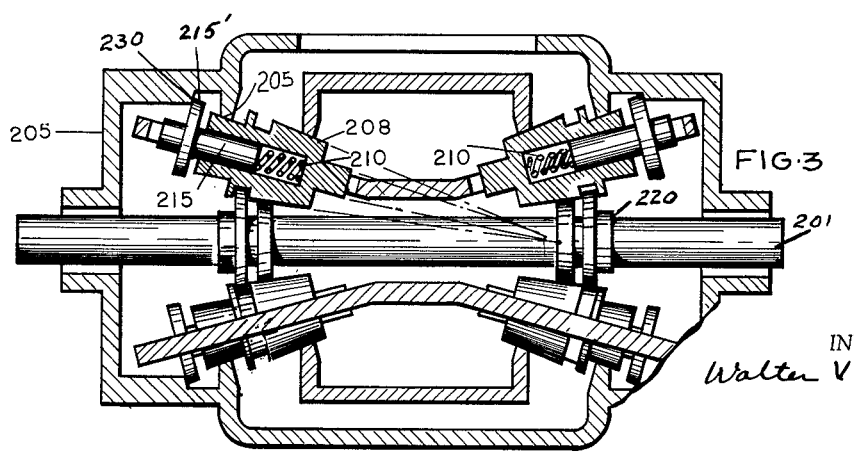
FIG. 3 is a view of another embodiment of the invention wherein the preload springs are placed between two separate parts of each of the planetary rolls.

FIG. 3 shows an embodiment wherein preload springs 210 are placed between planetary rolls 208 and pins 215. The pins 215 are slidably received in the rolls 208. The pins 215 have flanges 215' intermediate their length which are in contact with outer ring 230 on the apex which is common to the planetary rolls 208 and outer ring 205. When the outer ring 205 is stationary, the speed of the flanges 215' of the pins 215 at the contact point with the ring 230 is zero and the system is balanced. Wheels 220 are slidably supported on a shaft 201 and their peripheries are disposed in grooves in the rolls 208.

Figure 4:
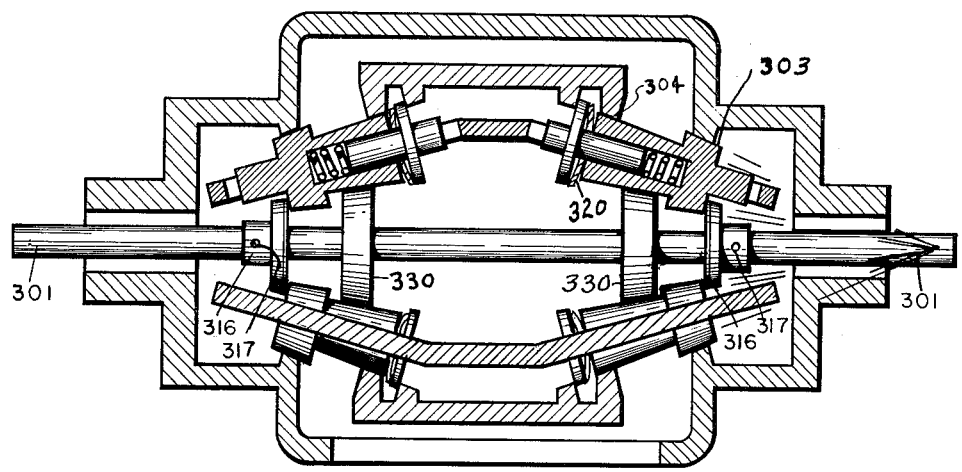
FIG. 4 is a view of still another embodiment of the invention wherein planetary rolls are held in alignment by collars on the shaft.

In the embodiment of the invention shown in FIG. 4, the same method of preload on rolling elements is used as in FIG. 3; however, instead of springs, thin belleville washers 320 assembled in parallel are used. At low speed, the belleville washers 320 provide a maximum preload on rolling elements. When the speed of the planetary rolls around their axes reaches the maximum revolutions per minute, the centrifugal forces developed in the washers 320 will flatten them, reducing the preload on the rolling elements at the contact point with sun wheels 330 to normal. Therefore, the life of the transmission is greater. At the same time, the centrifugal forces developed in the planetary rolls will preload the rolling elements at the contact points with the outer rings 303 and 304 on the shafts shown and this compensates for the loss of a preload through the belleville washers 320.

Over-travelling of the planetary rolls is prevented by using collars 316 on the shaft 301. The collars 316 are locked on the shaft 301 by screws 317 or other suitable means.

Figure 5:
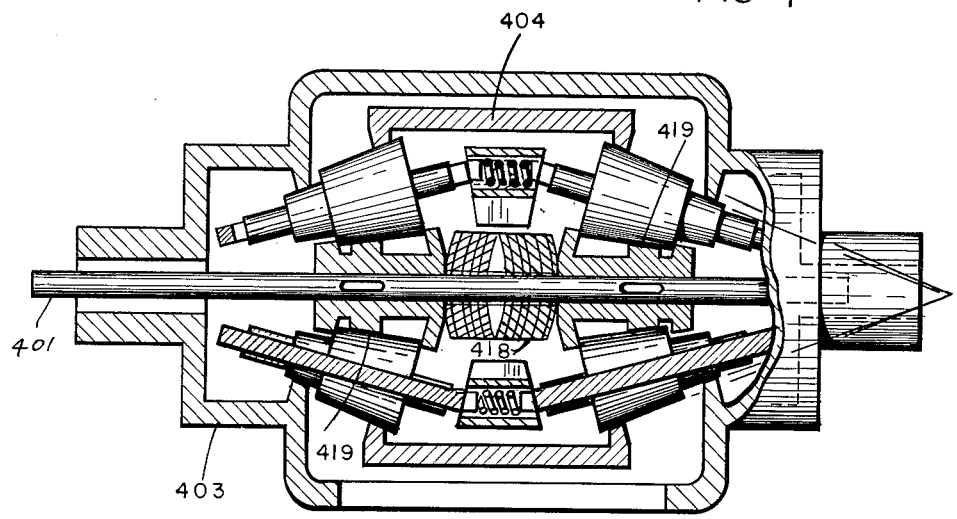
FIG. 5 is a view of yet another embodiment of the invention wherein additional preload on rolling elements is provided by springs or belleville washers placed between the sun rolls or the housing and outer rings.

FIG. 5 shows another embodiment wherein additional preload on the rolling elements is made by springs 418 or belleville washers placed between sun rolls or between the housing and the outer rings 403 and 404. The planetary rolls are located by sun wheels 419 which can slide on a shaft 401.

The assembly of the springs or thin belleville washers 418 in parallel provides a maximum preload on rolling elements at the contact points with the sun wheels 419 at low speed. At high speed, the centrifugal forces developed in the washers 418 will reduce the preload on the rolling elements to normal at the contact points with the sun wheels 419. The preload on the rolling elements at the contact points with the outer rings 403 and 404 is similar to that described in connection with FIG. 4.

The foregoing specification sets forth the invention in its preferred practical forms but it is understood that the structure shown is capable of modification within a range of equivalents without departing from the invention which is to be understood is broadly novel as is commensurate with the appended claims.

The embodiments of the invention in which an exclusive property or privilege is claimed are defined as follows:

1. A planetary transmission comprising an inner ring housing having first and second spaced internal peripheral surfaces, a shaft, said first ring surface being inclined toward one end of said shaft and said second ring surface being inclined toward another end of said shaft, said shaft having spaced, frusto-conical shaped sun rolls fixed thereto with the large ends of said sun rolls toward each other, frusto-conical shaped planetary rolls, said planetary rolls having a first portion in rolling contact with said sun rolls and with said ring surfaces, and an outer housing having first and second spaced internal ring surfaces, said first ring surface on said outer housing being inclined toward one end of said shaft and said second ring surface on said outer housing being inclined toward another end of said shaft, said ring surfaces being in rolling contact with a second portion on said planetary rolls of different diameter than said first portion and spaced therefrom, the central axes of said frusto-conical sun rolls, an extension of the surfaces of said planetary rolls, and said internal surfaces of said housings all converging to a point, all said parts at contact points having common axes, said planetary rolls comprising first and second planetary rolls, said planetary rolls being urged apart by springs placed between them, said first ring surface being adapted to be used as a reaction member.

2. The transmission recited in claim 1 wherein large portions of said planetary rolls are in rolling contact with said sun rolls.

3. The transmission recited in claim 2 wherein said transmission has a planetary cage, said planetary cage comprising an input, said first ring surface being adapted to function as reactive and said second ring surface being an output.

4. The transmission recited in claim 2 wherein preload springs are placed between said planetary rolls, the larger portions of said planetary rolls being in rolling contact with said outer housing.

5. The transmission recited in claim 1 wherein the larger portions of said planetary rolls contact said outer housing at the same end thereof as said outer housing is in contact with said planetary rolls.

6. The transmission recited in claim 1 wherein said first internal ring surface is free in said ring housing, said internal rings being held from turning by friction resulting from preload, said internal ring surfaces receiving said preload by springs on said planetary rolls, said internal ring surfaces slipping in case of overload, said internal ring surfaces serving as an overload protection.

7. The transmission recited in claim 1 wherein a collar is locked on a sun roll shaft, said collar being in rolling contact with said planetary rolls said collar limiting the axial travel of said sun rolls.

8. The transmission recited in claim 7 wherein said collars are preloaded by springs.

9. A transmission comprising a ring housing, spaced rows of planetary rolls, first and second locating rings on said ring housing for adjusting the axial travel of said planetary rolls, the first and second rows of said planetary rolls being in engagement with said ring housing, sun wheels in engagement with said planetary rolls, a planetary cage supporting said planetary rolls, said first locating ring being placed at one end of the first row of planetary rolls and said second locating ring being placed at another end of the second row of said planetary rolls, said rings being in rolling contact with said planetary rolls at the same end thereof as said ring housing is in contact with said planetary rolls, said rings preventing said planetary rolls from over-travelling axially.

10. A transmission comprising a housing, a planetary cage suported in said housing, planetary rolls in said planetary cage, a first and a second frusto-conical surface on each said planetary roll, a ring member having two opposed, internal frusto-conical surfaces thereon engaging one said frusto-conical surface on each said planetary roll, a ring in said housing at each end thereof engaging said second frusto-conical surface on each said roll, a locating ring at each end of said housing engaging an end of each said second frusto-conical surface, means to locate said locating ring in engagement with said planetary rolls to position said planetary rolls, spring members in said planetary cage urging said planetary rolls part, and two sun rolls fixed together, each engaging some of said planetary rolls.

11. A transmission comprising a housing, a planetary cage supported in said housing, planetary rolls in said planetary cage, a first and a second frusto-conical surface on each said planetary roll, a ring member having two opposed, internal frusto-conical surfaces thereon engaging one said frusto-conical surface on each said planetary roll, a shaft, spaced rings on said shaft, each said ring engaging said second frusto-conical surface on said planetary rolls, a locating ring at each end of said housing engaging the ends of one surface of said planetary rolls, means to locate said locating ring in engagement with said planetary rolls to position them, spring members in said planetary cage urging said planetary rolls apart, and two sun rolls fixed together, each engaging some of said planetary rolls.

12. A transmission comprising a housing, a planetary cage supported in said housing, planetary rolls in said planetary cage, a first and a second frusto-conical surface on each said planetary roll, a ring member on said housing having two opposed, internal frusto-conical surfaces thereon each said frusto-conical surface on a ring member being in frictional rolling engagement with one said frusto-conical surface on a said planetary roll, a shaft, spaced sun rolls slidably supported on said shaft and restrained to rotate therewith, each said sun roll having spaced flanges thereon receiving one said frusto-conical surface of each said planetary roll therebetween, said flanges at each end of said sun rolls engaging an end of each said frusto-conical surface of said planetary rolls, means to urge said sun rolls toward said planetary rolls to urge them apart, and spring members in said planetary cage urging said planetary rolls apart.

13. A planetary transmission comprising a planetary member, a first ring housing, a second ring housing, said planetary member comprising planetary rolls having a first frusto-conical surface engaging said first ring housing and a second frusto-conical surface engaging said second ring housing, a shaft axially disposed in each said planetary roll, a cylindrical surface on each said shaft, a spring in each said roll urging said shaft out of each said roll, means on said first ring housing limiting the movement of said shafts out of said rolls, a sun member engaging said first frusto-conical surface of said rolls, and means on said sun member limiting the movement of said rolls.

References Cited by the Examiner

UNITED STATES PATENTS

| | | | |
|---|---|---|---|
| 1,463,610 | 7/23 | Cowburn | 74—755 |
| 1,718,846 | 6/29 | Arter | 74—796 |
| 1,903,390 | 4/33 | Piercey | 74—772 |
| 2,239,983 | 4/41 | Bade | 74—796 |
| 2,874,593 | 2/59 | Legros | 74—796 |
| 3,035,459 | 5/62 | Legros | 74—796 |
| 3,048,058 | 8/62 | Chery | 74—798 |

FOREIGN PATENTS 923,107    2/47    France.

DON A WAITE, *Primary Examiner.*